No. 653,454. Patented July 10, 1900.
E. F. MERTZ.
ICE VELOCIPEDE.
(Application filed Nov. 6, 1899.)
(No Model.) 2 Sheets—Sheet 1.
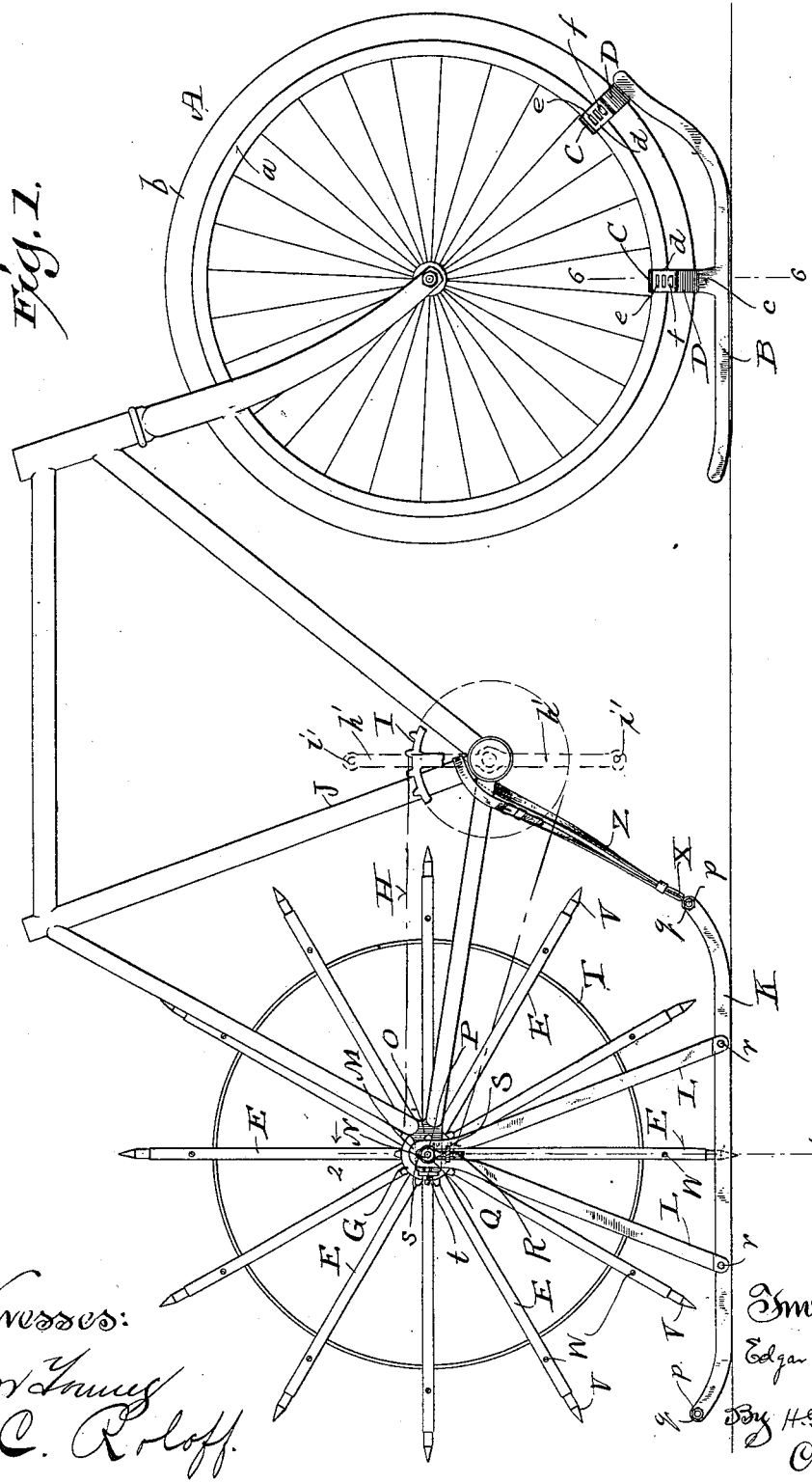

No. 653,454. Patented July 10, 1900.
E. F. MERTZ.
ICE VELOCIPEDE.
(Application filed Nov. 6, 1899.)
(No Model.) 2 Sheets—Sheet 2.
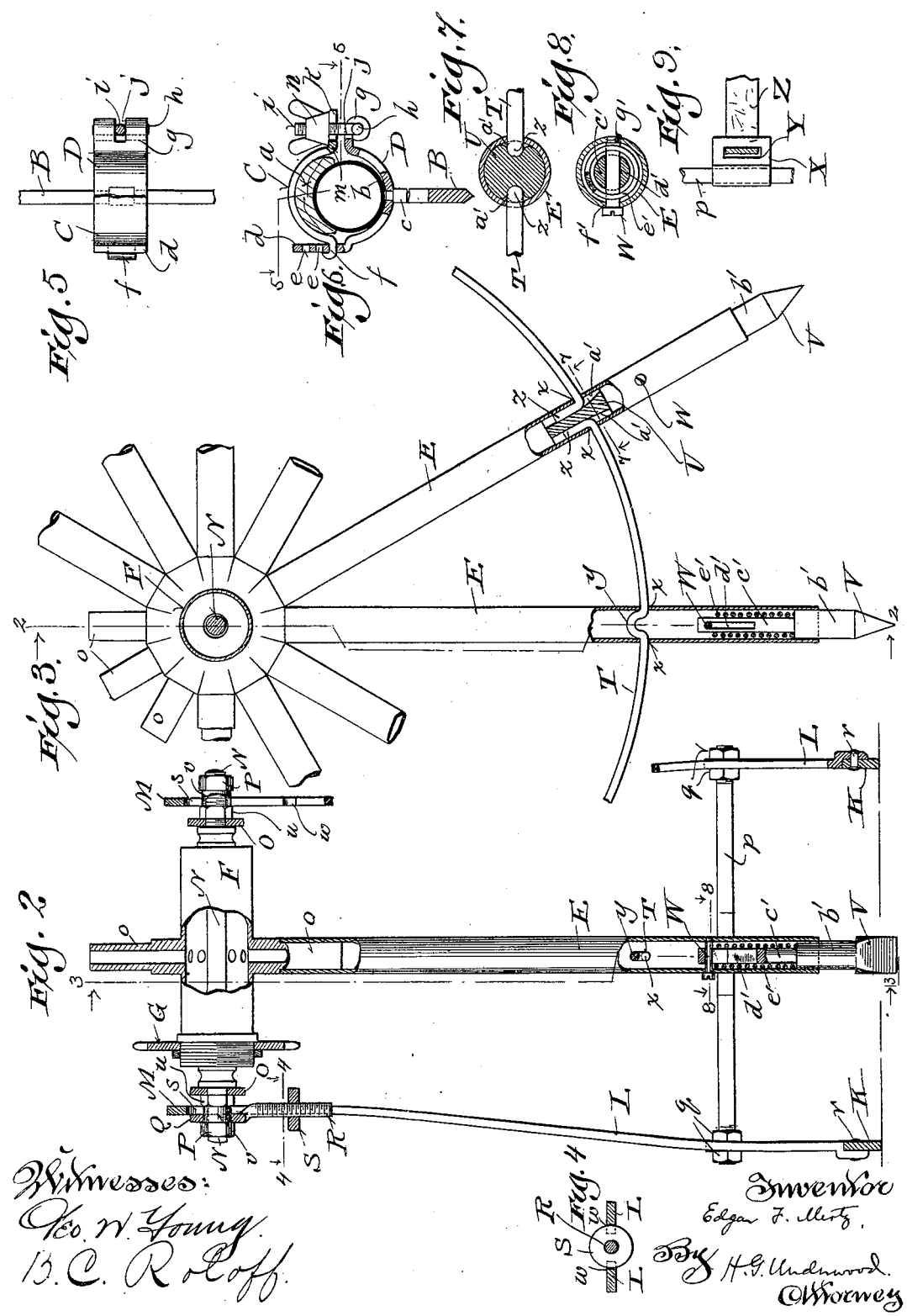

UNITED STATES PATENT OFFICE.

EDGAR F. MERTZ, OF MILWAUKEE, WISCONSIN.

ICE-VELOCIPEDE.

SPECIFICATION forming part of Letters Patent No. 653,454, dated July 10, 1900.

Application filed November 6, 1899. Serial No. 736,010. (No model.)

*To all whom it may concern:*

Be it known that I, EDGAR F. MERTZ, a citizen of the United States, and a resident of Milwaukee, in the county of Milwaukee and State of Wisconsin, have invented certain new and useful Improvements in Vehicles; and I do hereby declare that the following is a full, clear, and exact description thereof.

My invention relates especially to that class of vehicles generally known as "ice-bicycles" or "ice-velocipedes;" and it consists in certain peculiarities of construction and combination of parts, as will be fully set forth hereinafter and subsequently claimed.

In the drawings, Figure 1 is a side elevation of an ice-bicycle embodying my present invention, the handle-bar, saddle, and portions of the driving mechanism not being shown, as the same are identical with like parts in an ordinary bicycle. Fig. 2 is a broken end elevation of that portion of the rear wheel of my device indicated by the line 2 2 of Fig. 1 looking toward the rear end from said line and partly in section on the line 2 2 of Fig. 3, also showing the rear members of the hub-supports and the rear runners partly broken away or in section. Fig. 3 is an enlarged detail elevation of part of the rear wheel, partly in section, on the line 3 3 of Fig. 2. Fig. 4 is a detail sectional view on the line 4 4 of Fig. 2. Fig. 5 is a detail plan view of one of the front runner-clamps, partly in section, on the plane indicated by the line 5 5 in Fig. 6. Fig. 6 is a detail sectional view through the front wheel and its runner and clamp on the line 6 6 in Fig 1. Fig. 7 is a detail sectional view through one of the spokes of the rear wheel on the line 7 7 in Fig. 3. Fig. 8 is a like sectional view on the line 8 8 in Fig. 2. Fig. 9 is a detail view illustrating the connection of the strap and forward cross-brace of the rear runners shown in Fig. 1.

My present invention constitutes an improvement on the ice-velocipede shown in Patent No. 616,099, granted to Henry Grimshaw and myself on December 20, 1898, and, like said prior device, consists in attachments to an ordinary bicycle, wherein the rear wheel is removed and a special propelling device is substituted therefor to adapt the machine for travel upon ice or snow roads, although my device is intended to be newly built complete, as well as to be constructed by the reorganization of an ordinary bicycle.

Referring to the drawings, A represents the front wheel of my bicycle, $a$ the rim, and $b$ the pneumatic tire thereof, said parts and the hub and spokes thereof being of the ordinary bicycle-wheel construction. B represents the runner for said front wheel, said front runner having a horizontal main portion and an upwardly-projecting front end. This runner is secured to the front wheel A by two clamps C D C D, the lower member D of the rear clamp being secured to a projection $c$, rising from the horizontal main portion of the runner B, while the lower member D of the front clamp is preferably brazed or otherwise secured directly to the front end of said runner, the two clamps being identical in construction and shown in detail in Figs. 5 and 6, the said members C D being oppositely curved on rounded concave lines to receive between them the rim $a$ and the tire $b$ of the wheel A. The said lower member D projects upwardly at its rear end, as shown at $d$, this part having a series of transverse perforations $e\ e$ therethrough to adjustably receive the hooked tongue $f$ of the upper clamp member C. The forward end $g$ of the lower member D projects horizontally and then is bent and curved beneath and backward to form a seat for the head $h$ of a screw-bolt $i$, whose shank projects up through a slot $j$ in said end $g$ of the member D and through a like slot $k$ in the forwardly-projecting front end $m$ of the clamp member C, the two ends being drawn together and the rim and tire being tightly held by the said clamp by a thumb-nut $n$, all as best shown in Fig. 6.

As in the prior patent hereinbefore named, the rear propelling device of my ice-bicycle consists of a series of spokes radiating from a hub and provided with ice-dogs at their ends, said hub being supported from a pair of rear runners between which said spokes (constituting what I term my "rear" wheel) revolve. E E represent the said spokes, which are hollow and brazed or otherwise secured to a series of nipples $o\ o$, rigid with and radiating from the rear hub F, which latter is of substantially the same construction as that of an ordinary bicycle-hub, carrying the usual rear sprocket-wheel G for engagement by means of an ordinary sprocket-chain H with the sprocket-wheel I on the frame J of the bicycle and rotated by the cranks $h'$ and pedals $i'$ in the ordinary manner, as shown or indicated by broken and dotted lines in Fig. 1.

K K represent the rear runners of my device, said runners having upwardly-projecting front and rear ends connected together by cross-braces $p\ p$ and nuts $q\ q$. L L represent the diverging arms of the hub-supports, secured at their lower ends, as by rivets $r\ r$, to the said rear runners K K, each pair of said arms L L converging at their upper ends and there being merged into a plate M, which plate has a vertical slot $s$ therethrough. The axle N of the rear hub F passes freely through the said slots in the plates M M.

O O represent the ordinary slotted end plates at the rear junction of the rear-fork arms and rear-fork stays or braces of the bicycle-frame J, said end plates O being mounted on and secured to the rear axle N in the usual manner, as shown at $t$ in Fig. 1, beyond which points the ends of said axle N extend through the slotted plates M M of the hub-supports, the axle N first receiving nuts $u\ u$ and then sleeves $v\ v$, rigid with nuts P P. On each of the described nut-sleeves $v$ is suspended a plate Q of greater width than that of the slot $s$ in the adjacent plate M, outside of and against which plate M the plate Q has bearing, and from the lower edge of plate Q there extends a downwardly-projecting screw-bolt R, which is inwardly offset, so as to be in line with and between the parallel faces of the upper ends of the arms L L, said faces forming, in effect, a continuation of the described slot $s$ in the plate M.

S represents a nut in engagement with the screw-bolt R, said nut being held against vertical movement on the screw-bolt R by reason of being engaged within transverse grooves $w\ w$ in the opposed faces of the hub-supporting arms L L, and thus any movement of the said nut S will result in raising or lowering the hub-axle N with relation to the hub-supports L L, according to the direction in which said nut is turned, thereby serving to raise or lower the hub on said axle and the spokes E E, secured to said hub.

The spokes E E are all connected together and strengthened by an annular brace T, preferably formed of a single strip of wire, which is threaded through opposed holes $x\ x$ in all of the spokes except one, and then a suitable tool is inserted through the open lower end of each of said spokes, so as to form an inward bend of the portion of the wire within the spokes, as best shown at $y$ in Fig. 3, which firmly secures the annular brace T in place, and then the ends $z\ z$ of said wire strip are inserted through the holes $x\ x$ of the remaining spoke, and a plug U, formed with parallel exterior longitudinal grooves $a'\ a'$, is driven in through the open end of said remaining spoke, which serves to bend and confine said ends $z\ z$ of the annular brace T, as shown in Figs. 3 and 7.

V V represent my ice-dogs, which have chisel-shaped points, as in the prior patent hereinbefore named; but in my present invention said ice-dogs are very differently secured to the spokes. Each dog is formed rigid or integral with a rounded shank $b'$ of a diameter to fit just within the spoke E, and from this shank there extends a second rigid or integral rounded shank $c'$ of still smaller diameter, having an elongated or longitudinal slot $d'$ therethrough. Around this shank $c'$ is placed a spiral spring $e'$, whose outer end rests on the inner end of the shank $b'$, and this ice-dog, with its spring, is inserted in the lower open end of the spoke E and held in place therein by means of a screw W, which is inserted through a hole $f'$ in the said spoke and passes through the slot $d'$ in the ice-dog shank $c'$ and thence into a screw-threaded bore $g'$ in said spoke, as shown best in Figs. 2 and 8. By this construction the spring $e'$ is confined between the screw W and inner end of the shank $b'$ and the ice-dog afforded the necessary play within the spoke.

X represents a loop, preferably of metal, secured around the forward cross-piece $p$ of the rear runners K K and having a projecting end with a slot Y therein, and Z represents a strap passed through this slot and around the adjacent part of the frame J, as shown in Figs. 1 and 9, to guard against separation or strain between the said runners and frame when the device is passing over obstacles or unusual elevations or depressions in the roadway.

The operation of my device, which will be readily understood from the foregoing description of its construction, taken in connection with the accompanying drawings, is substantially the same as in the prior patent to which reference has been made and on which the present device is an improvement, and as in said former patent the present invention may be utilized by removing the rear wheel of an ordinary bicycle and substituting the described rear propelling device therefor and adding the described front runner B to the front wheel of the bicycle without other change, whereby the owner of a bicycle can readily adapt the same for use in the winter season and as readily restore the bicycle to its ordinary condition when desired, thereby saving the cost of separate bicycles for the different seasons, although, as stated, when desired the present device is intended to be made and sold in its complete form, and, as before, this present invention is capable of use with other forms of ice or snow vehicles besides bicycles, although especially designed therefor.

Having thus described my invention, what I claim as new, and desire to secure by Letters Patent, is—

1. In a propelling device for ice-vehicles, the combination with a hub of a series of spoke-nipples radiating therefrom; a series of open tubular spokes secured to said nipples; a series of ice-dogs having shanks fitting within the open ends of said spokes, and additional shanks of less diameter rigid therewith and provided with longitudinal slots; screw-bolts passing transversely through said spokes and through said slots; and springs, surrounding said slotted shanks, within said spokes.

2. In a propelling device for ice-vehicles, the combination with a hub of a series of spoke-nipples radiating therefrom; a series of open tubular spokes secured to said nipples; a series of spring-controlled movable ice-dogs secured within the open ends of said spokes; a continuous wire strip passing through transverse openings in said spokes, forming an annular brace therefor; and a plug, having exterior longitudinal grooves, driven into one of said spokes, and securing the ends of said wire strip.

3. In a propelling device for ice-vehicles, the combination with a supporting-frame of a pair of runners; a pair of arms rising from each runner, and converging at the top, and there merging into a slotted plate, said arms having opposed inner transverse grooves communicating with the slots in said plates; nuts in engagement with said grooves; a hub-axle passing through the said plate-slots above said grooves; a hub supported on said axle and having propelling-spokes radiating therefrom; nuts secured to the ends of said axle, and having inwardly-projecting sleeves, rigid with said nuts, passing through said plate-slots; and plates mounted on said nut-sleeves and bearing against said slotted plates, and having inwardly-offset downwardly-projecting screw-bolts in engagement with the nuts engaged by the transverse grooves in said arms.

In testimony that I claim the foregoing I have hereunto set my hand, at Milwaukee, in the county of Milwaukee and State of Wisconsin, in the presence of two witnesses.

EDGAR F. MERTZ.

Witnesses:
H. G. UNDERWOOD,
B. C. ROLOFF.